UNITED STATES PATENT OFFICE.

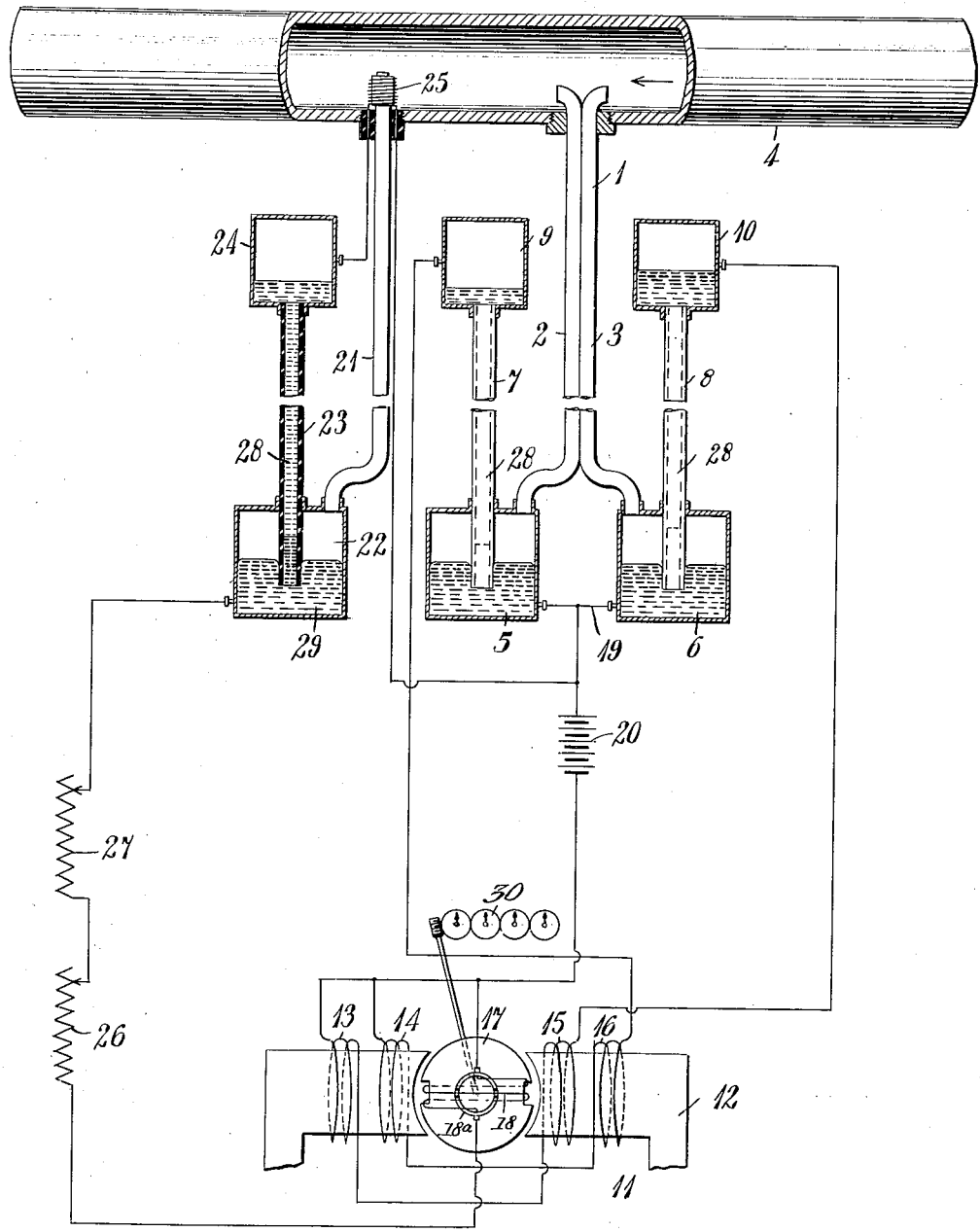

SAMUEL TROOD, OF WILKINSBURG, PENNSYLVANIA, ASSIGNOR TO WESTINGHOUSE ELECTRIC AND MANUFACTURING COMPANY, A CORPORATION OF PENNSYLVANIA

MEASURING INSTRUMENT.

1,185,735.      Specification of Letters Patent.      Patented June 6, 1916.

Application filed October 3, 1913. Serial No. 793,118.

*To all whom it may concern:*

Be it known that I, SAMUEL TROOD, a citizen of the United States, and a resident of Wilkinsburg, in the county of Allegheny and State of Pennsylvania, have invented a new and useful Improvement in Measuring Instruments, of which the following is a specification.

My invention relates to measuring instruments and particularly to steam-flow meters.

The object of my invention is to provide a steam-flow meter for switchboard service that is substantially automatic in its operation.

My copending United States application, Serial No. 793,117, filed October 3, 1913, discloses a steam-flow meter that is substantially automatic in its operation but which should be mounted preferably near the steam line in which the steam flows that is to be measured. In my present invention I provide a U tube for indicating the flow of steam and I provide means for correcting the indication of the steam flow in a conduit in which the pressure and temperature are substantially constant as determined by the U tube for any small variations in temperature and pressure. In order to mount such an instrument on a switchboard, I provide an especially constructed electrical measuring instrument that is supplied with energy which is dependent upon the velocity, pressure and temperature of the steam to be measured.

The single figure of the accompanying drawings is a diagrammatic view of a steam-flow meter embodying my invention.

A Pitot tube 1 that comprises two compartments 2 and 3, is inserted in a steam line or pipe 4, in a manner familiar to those versed in the art, for the purpose of determining the velocity of the steam. The compartments 2 and 3 severally comprise a reservoir of mercury 5 and 6, a non-conducting tube 7 and 8 of relatively small cross-sectional area and a relatively large closed conducting chamber 9 and 10. A fluid having a relatively high resistance is contained in the non-conducting tubes 7 and 8 for purposes hereinafter more fully set forth. For indicating the readings of the various tubes, I provide an electrical measuring instrument 11 comprising a two-pole magnetizable member 12 that has two field windings 13 and 14 on one leg and two field windings 15 and 16 on the other leg thereof, an armature 17 with an armature winding 18 thereon and a commutator cylinder 18ª. The reservoirs 5 and 6 of the Pitot tube 1 are connected together electrically by a conductor 19 that is also connected, through a battery 20, to the field windings 13 and 14. The field windings 13 and 14 are wound with their convolutions in opposite directions, in order that the magnetic flux set up by the winding 13 shall oppose that set up by the winding 14. The field winding 13 is connected in series relation to the field winding 15 to constitute a circuit from the battery 20 to the conducting chamber 10, while the field winding 14 is connected in series relation to the field winding 16 to constitute a circuit from the battery 20 to the conducting chamber 9. The field windings 15 and 16 are so wound that they induce magnetic lines of force in opposite directions in the magnetizable member 12. From the foregoing, it will be seen that the windings 13 and 15 are connected to oppose the windings 14 and 16.

A U tube 21 is inserted in the steam line 4 and comprises a reservoir 22, a non-conducting tube 23 of relatively small cross-sectional area and a relatively large conducting chamber 24. Around that part of the tube 21 that projects into the steam pipe 4 is wound a resistor 25. The resistor 25 is connected in a circuit comprising the battery 20, the armature winding 18, a variable-resistance resistor 26, a second variable-resistance resistor 27 and a high-resistance fluid 28 that is contained in the tube 23. The high-resistance fluid 28 is forced upwardly by the mercury 29 contained in the reservoir 22 when the pressure increases in the steam line 4.

Since the quantity of steam that traverses a conduit depends upon its velocity, pressure and temperature, I have provided a meter, as hereinbefore stated, that responds to these variables. I have also provided adjusting means for the instrument.

When no steam traverses the pipe 4, there is no difference of pressure in the tubes 2 and 3 and the mercury in the reservoirs 5 and 6, and, likewise, the relatively high-resistance fluids in the tubes 7 and 8 will remain on the same level, and, since the resistances of the two circuits are equal, the same exciting current will flow through all the field windings. Thus, no resulting magnetic lines of force will traverse the air gap between the field magnet poles of the magnetizable member 12. However, should steam traverse the pipe 4, in a direction as shown by the arrow, a difference in the resultant pressure will cause the mercury, or other conducting liquid, to stand at a higher level in the tube 8 than in the tube 7, which difference is proportional to the square of the velocity of the steam flowing. When the mercury rises in the tube 8 higher than in the tube 7, the resistance in series with the field windings 13 and 15 is lessened, by reason of the shorter column of high-resistance fluid, and the current flowing through the same is increased to cause magnetic lines of force to be set up in the magnetizable member 12 in accordance with the velocity of the steam.

The current that traverses the armature is adapted to vary in accordance with the pressure and the temperature of the steam because the resistance of the resistor 25 and the resistance of the fluid 28 in the tube 23 are varied when the temperature and the pressure vary. When the pressure increases, the mercury rises in the tube and decreases the length of the column of high-resistance fluid, thus causing more current to flow through the armature winding 18. However, when the temperature of the steam increases, the resistance of the resistor 25 increases and thus decreases the current in the armature winding 18 in accordance with the increase in temperature. Therefore, the armature 17 will rotate in accordance with the velocity, the pressure and the temperature of the steam. Since the quantity of steam to be measured depends upon the velocity, pressure and temperature, the rotation of the armature indicates the quantity of the steam traversing the pipe 4.

I provide variable resistors 26 and 27 for controlling the current in the armature winding 18, to adjust the speed of the instrument. One of the resistors may be used for calibrating the instrument for various sizes of pipe and the other for calibrating the instrument in order that it may indicate in various units. The conducting chambers 9, 10 and 25 are relatively large with respect to the volume of the tubes 7, 8 and 23 in order that the compression therein may not affect the operation of the device to any material degree.

I desire it to be understood that changes may be made in the actual construction of my invention, for the purposes of simplifying the design, that will not depart from the spirit of same as set forth in the appended claims.

I claim as my invention:

1. A steam-flow meter comprising a plurality of U tubes severally containing a relatively low-resistance fluid and a relatively high-resistance fluid, the resistance of the said fluids being adapted to vary with the velocity and the pressure of the steam to be measured, a resistor the resistance of which is responsive to the temperature of the steam, a measuring instrument, and means controlled by the said temperature-responsive means and the resistance of the said relatively high-resistance fluids for actuating the said measuring instrument.

2. A fluid meter comprising a plurality of U tubes severally containing a relatively low-resistance fluid and a relatively high-resistance fluid in one arm thereof, said tubes being so disposed as to cause the resistance of the fluids to vary with the velocity and pressure of the fluid to be measured, a measuring instrument, and means controlled by the relative resistances of the said high-resistance fluids for operating the said measuring instrument.

3. A fluid meter comprising a plurality of U tubes severally containing a relatively low-resistance fluid and a relatively high-resistance fluid in one arm thereof, said tubes being so disposed as to cause the resistance of the fluids therein to vary with the velocity of the fluid to be measured, a measuring instrument, and means controlled by the relative resistances of the said high-resistance fluids in the said tubes for operating the said measuring instrument.

4. In a fluid flow meter for a steam conduit, the combination with a plurality of tubes having orifices opening into the conduit, reservoirs containing mercury, non-conducting tubes attached to the reservoirs with conducting receptacles thereon, said non-conducting tubes containing a relatively high-resistance fluid, one of the said orifices pointing in the direction of the steam flow, one opposite to the direction of flow and another perpendicularly to the direction of the flow of the steam to be measured, a resistor mounted adjacent to one of the orifices, a measuring instrument, and means controlled by the resistance of the resistor and the resistances of the relatively high-resistance fluids for operating the measuring instrument.

5. A steam-flow meter comprising a plurality of tubes severally having reservoirs containing mercury and non-conducting tubes attached thereto containing a relatively high-resistance fluid, a resistor exposed to the steam to be measured, an electrical measuring instrument, and a source of electromotive force controlled by the resistance of the resistor and the relative resistances of the relatively high-resistance fluids for operating the measuring instrument.

6. A fluid meter comprising a plurality of tubes severally having reservoirs containing mercury and non-conducting tubes attached thereto containing a relatively high-resistance fluid, said tubes being adapted to cause the said high-resistance fluid to assume various lengths in the said non-conducting tubes in accordance with the velocity and pressure of the fluid to be measured, an electrical measuring instrument, and a source of electromotive force controlled by the relative variation in heights of the relatively high-resistance fluids to operate the said electrical measuring instrument.

7. In a fluid meter, the combination with a mercury-containing receptacle and means for transmitting the pressure of the fluid to be measured to the said receptacle, of a relatively high-resistance fluid contained in the said receptacle, the resistance of the said high-resistance fluid being dependent upon the displacement of the mercury in the receptacle, an electrical measuring instrument, and a source of current connected between the said instrument and the said receptacle, said instrument being controlled by the change in the resistance in the said high-resistance fluid.

8. A steam-flow meter comprising a plurality of U tubes severally containing mercury and a relatively high-resistance fluid in one arm thereof, the heights of the high-resistance fluids adapted to vary in accordance with the change in velocity and pressure of the steam to be measured, a resistor having a resistance dependent upon the temperature of the steam, a measuring instrument, and means controlled by the resistance of the temperature-controlled resistor and the heights of the relatively high-resistance fluids in the several tubes for operating the said measuring instrument to indicate the quantity of steam being measured.

9. A steam-flow meter comprising a plurality of U tubes severally containing a relatively low-resistance fluid and a relatively high-resistance fluid in one arm thereof, the resistance of the said high-resistance fluids being adapted to vary with the change in velocity and pressure of the steam to be measured, means responsive to the temperature of the steam, a measuring instrument, and means controlled by the said temperature-responsive means and the resistance of the said relatively high-resistance fluids for actuating the said measuring instrument.

In testimony whereof, I have hereunto subscribed my name this 22nd day of Sept. 1913.

SAMUEL TROOD.

Witnesses:
B. B. HINES,
M. C. MERZ.